(12) United States Patent
Raby et al.

(10) Patent No.: US 6,252,863 B1
(45) Date of Patent: Jun. 26, 2001

(54) MULTIPATH COMPENSATION FOR PSEUDORANGE SIGNALS

(75) Inventors: Peter Raby, London (GB); Stuart Riley, San Francisco, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 08/629,963

(22) Filed: Apr. 9, 1996

(51) Int. Cl.$^7$ .............................. H04B 7/212; H03D 1/04
(52) U.S. Cl. .......................................... 370/335; 375/150
(58) Field of Search .................................... 370/316, 324, 370/320, 332, 335, 350, 516, 342, 503; 375/346, 347, 267, 140, 145, 150

(56) References Cited

U.S. PATENT DOCUMENTS

| | | |
|---|---|---|
| 4,007,330 | 2/1977 | Winters . |
| 4,168,529 | 9/1979 | Tomlinson . |
| 4,203,070 | 5/1980 | Bowles et al. . |
| 4,203,071 | 5/1980 | Bowles et al. . |
| 4,550,414 | 10/1985 | Guignon et al. . |
| 4,608,569 | 8/1986 | Dickey et al. . |
| 4,660,164 | 4/1987 | Leibowitz . |
| 4,829,543 | 5/1989 | Borth et al. . |
| 4,862,478 | 8/1989 | McIntosh . |
| 5,091,918 | 2/1992 | Wales . |
| 5,101,416 | 3/1992 | Fanton et al. . |
| 5,164,959 | 11/1992 | Cai et al. . |
| 5,282,228 | 1/1994 | Scott et al. . |
| 5,347,536 | 9/1994 | Meehan . |
| 5,390,207 | 2/1995 | Fenton et al. . |
| 5,402,450 | 3/1995 | Lennen . |
| 5,414,729 | 5/1995 | Fenton et al. . |
| 5,444,451 | 8/1995 | Johnson et al. . |
| 5,481,503 | 1/1996 | Kuhn et al. . |
| 5,488,662 | 1/1996 | Fox et al. . |
| 5,493,588 | 2/1996 | Lennon . |
| 5,495,499 | 2/1996 | Fenton et al. . |
| 5,903,597 * | 5/1999 | Pon ..................................... 375/209 |
| 5,963,601 * | 5/1999 | Pon et al. ............................. 375/345 |

OTHER PUBLICATIONS

R.E. Ziemer and R.L. Peterson, Digital Communications and Spread Spectrum Systems, Macmillon Publ., New York, 1985, pp. 419–447.

* cited by examiner

Primary Examiner—Chau Nguyen
Assistant Examiner—Chiho Andrew Lee
(74) Attorney, Agent, or Firm—John F. Schipper (57) ABSTRACT

Method and apparatus for synchronizing to a reference signal the timing of a received composite, code phase SATPS signal, such as a GPS or GLONASS signal, that consists of a preferred, interference-free signal distorted by at least one interfering signal, to determine an undistorted timing point, such as the preferred signal time of arrival. A first autocorrelation function $AC_f(\tau)$ is generated between the preferred, interference-free signal and a reference signal that replicates the preferred signal, as a function of the time shift $\tau$ between the two signals. A second autocorrelation signal $AC_M(\tau)$ is measured between the reference signal and the incoming signal. Three amplitudes $AC_M(\tau_{M,e})$, $AC_M(\tau_{M,p})$ and $AC_M(\tau_{M,l})$ of the second autocorrelation function and the corresponding code phase time shift values $\tau_{M,e}$, $\tau_{M,p}$ and $\tau_{M,l}$ are selected that satisfy at least one of the relations $0<\tau_{M,p}-\tau_{M,e}=f1\Delta\tau_{chip}$ and $0<\tau_{M,l}-\tau_{M,p}=f2\Delta\tau_{chip}$, ($0<f1$, $f2 \leq 0.5$). A shift PRC(t;j;rcv) in a pseudorange value associated with the incoming signal, measured at the user receiver, from at least one SATPS signal source, number j, is determined by a ratio of a first linear combination of the amplitudes $AC_M(\tau_{M,e})$, $AC_M(\tau_{M,p})$ and $AC_M(\tau_{M,l})$, multiplied by a selected parameter K' and divided by a second linear combination of these amplitudes, plus a second selected parameter K". The parameters K' and K" are determined by examination of the first correlation function $AC_f(\tau)$ and are independent of the values $AC_M(\tau_{M,e})$, $AC_M(\tau_{M,p})$, $AC_M(\tau_{M,l})$, $\tau_{M,e}$, $\tau_{M,p}$ and $\tau_{M,l}$, but may depend upon the selected fractions f1 and f2, upon the SATPS satellite number j, upon the characteristics of the receiver, and upon one or more of the coefficients in the linear combinations.

22 Claims, 8 Drawing Sheets

MULTIPATH COMPENSATION FOR PSEUDORANGE SIGNALS

FIELD OF THE INVENTION

This invention concerns identification and removal of multipath code phase signals in a Satellite Positioning System.

BACKGROUND OF THE INVENTION

Code phase signals and carrier phase signals in a Satellite Positioning System (SATPS), such as GPS or GLONASS, are subject to multipath signal errors. A code phase signal for GPS has an associated wavelength of 300 meters and 30 meters for C/A code and P code, respectively, and a typical multipath-based code phase location error will be about 1–10 percent of this wavelength. Spatially separating two SATPS antennas, which is usually done in differential SATPS operations, will often subject the signals received at each of these two antennas to multipath perturbations with different amplitudes and different phases.

Code phase signals are used in SATPS applications to provide a reasonably accurate measurement of a vector separating two SATPS antennas. Random noise in a code phase signal typically produces a location error of about ±(5–100) cm with zero mean for a one-second signal time average and is produced by thermal and atmospheric fluctuations in the signal path. With multipath signals absent, thermal and atmospheric fluctuations and atmospheric and antenna phase center delays would be the limiting factors on accuracy. Multipath signal error is thus an important factor in precise determination of a vector separating two SATPS antennas.

The intensity, phase and period of the multipath signals depends upon the physical environment in which the SATPS antenna operates. An environment in which relatively large multipath signals enter the antenna will cause correspondingly large code phase multipath signal errors. The multipath phase change, produce by a multipath signal that adds to or subtracts from the direct, undistorted signal, depends upon the relative rates of motion of the antenna and reflecting surface(s), the physical nature of the reflecting surface(s) and the satellite motion, among other things.

Previous attempts to mitigate, or compensate for, the effects of multipath signals on the ability of a two-receiver system to provide a precise measure of the separation vector have applied one of several operational approaches. In a first approach, the receiving antenna pattern is altered so that signal reflections from objects located at or near ground level are reduced. This approach usually requires use of physically large, and a fortiori non-portable, antennas and offers no mitigation for multipath signals received from reflecting surfaces that are located high off the ground. A second approach is to perform signal time averaging to reduce the multipath effects, with typical averaging times of 600–900 sec to significantly reduce multipath signal errors. This approach cannot be used for dynamic determination of the separation vector with a moving antenna.

Methods employed to acquire and demodulate data from spread spectrum transmissions is well known in the art See R. E. Ziemer and R. L. Peterson, *Digital Communications and Spread Spectrum Systems,* Macmillan Publ Co., New York, 1985, pp. 419–447 for a discussion of acquisition and demodulation of spread spectrum signals. A spread spectrum GPS receiver must obtain both code and carrier synchronization in order to demodulate the desired data successfully. Issues associated with tracking and accurately demodulating a spread spectrum signal, once the signal is acquired, are discussed in many references on GPS, such as Alfred Leick, *GPS Satellite Surveying,* John Wiley & Sons, New York, Second Edition, 1995, and Ziemer and Peterson, op cit.

A GPS signal contains a 50 bit/second navigation message and a unique spreading code (C/A) of length 1.023 kilobits, which is transmitted at a frequency of about 1.023 Mbits/sec. Signal acquisition requires that phase lock first occur with the radio frequency carrier and that the reference or local replica signal be synchronized with the spreading code. In signal synchronization, a local replica of the particular satellite code is synchronized in time with the incoming satellite signal code. A GLONASS signal is similar but relies on carrier frequency differences to discriminate between signals received from different satellites.

Once the Doppler error in the downlink signal from the satellite is appropriately compensated for and signal synchronization is obtained, the navigation message in the 50 bit/second modulation that forms the composite GPS signal (direct plus multipath) can be demodulated. This navigation message contains data on the satellite ephemerides and time pulses that indicate when the transmission originated from the satellite. By measuring the difference between the local clock time and the indicated satellite time of transmission, the time delay, and thus the instantaneous distance from GPS receiver to satellite, can be obtained by multiplying this time delay by the speed of light in the ambient medium.

Figure 1:
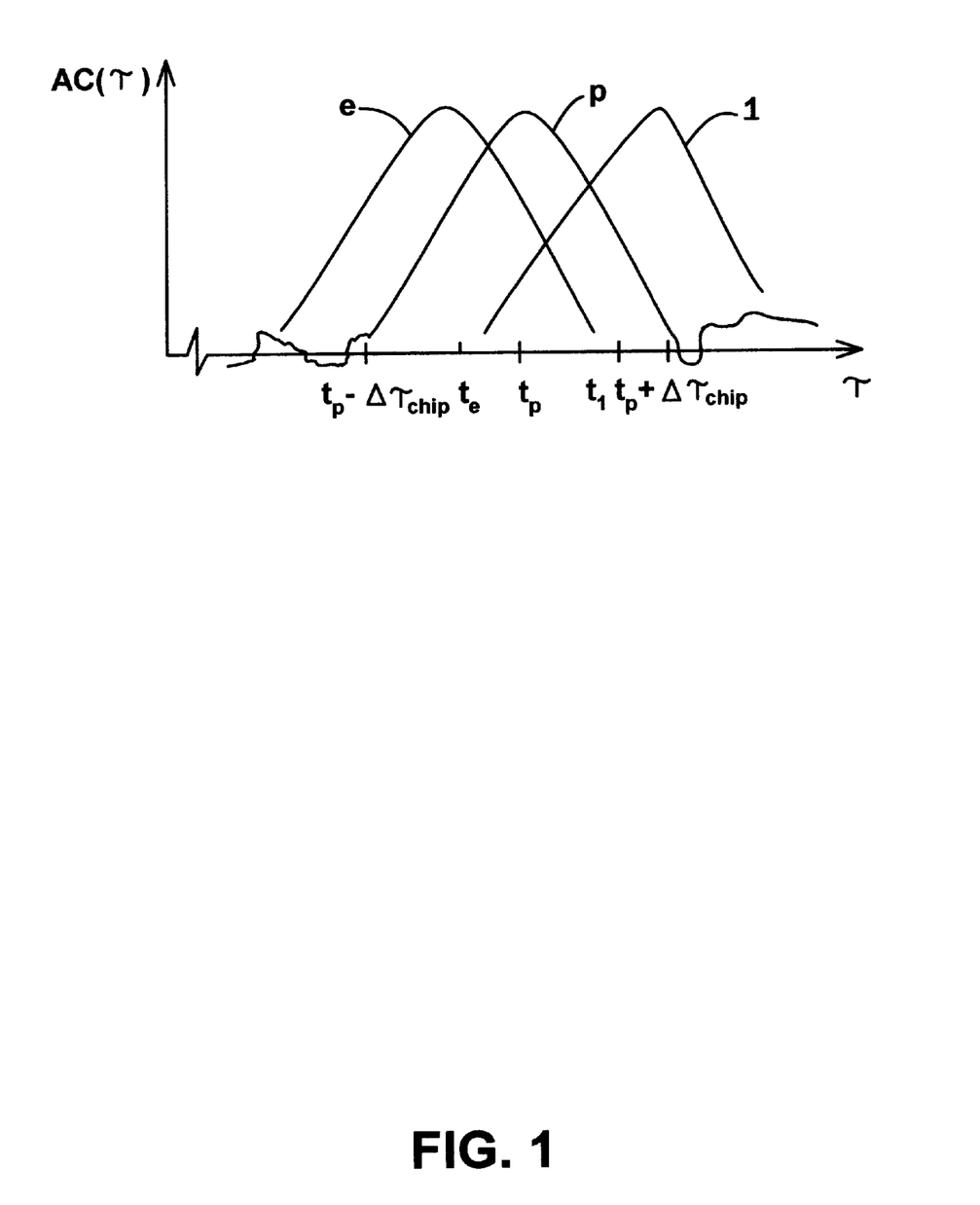
FIG. 1 illustrates early, punctual and late replicas of a representative autocorrelation function for a direct signal with no multipath signal present.

Signal synchronization is performed using a signal correlator. The correlator constantly compares the incoming signal with a local replica of the desired signal; a microprocessor adjusts a time shift $\tau$ of the local replica signal until satisfactory agreement is obtained. Because the incoming signal and the local replica signal are substantially identical, a measure of the degree of agreement of these two signals is often referred to as an autocorrelation function. A variety of autocorrelation functions $AC(\tau)$ are shown in various texts, and an example is shown in FIG. 1. An autocorrelation function $AC(t)$ is often formed according to the prescription $$AC(\tau) = \int_0^T S(t')S_0(t' + \tau)dt' \tag{1A}$$

or $$AC(\tau) = \sum_{k=1}^{K} S(t_k)S_0(t_k + \tau), \tag{1B}$$

depending upon whether integration or summation of sampled values over a suitable contribution time interval is used to compute the composite signal autocorrelation function. The length T of the contribution time interval used to compute the autocorrelation function in Eq. (1A) or (1B) is often chosen to be N times the chip length $\Delta\tau_{chip}$, where N is a large positive number.

Tracking the composite satellite signal requires maintaining signal synchronization. The peak of the autocorrelation function is rounded rather than pointed, due to finite bandwidth effects, so that locating a true peak is difficult. Some receiver designers have, therefore, resorted to an "early-minus-late" autocorrelation tracking method, as discussed by W. M. Bowles in "Correlation Tracking," Charles Stark Draper Laboratory, May 1980, by Fenton et al in U.S. Pat. Nos. 5,101,416, 5,390,207, 5,414,729 and 5,495,499, and by Lennen in U.S. Pat. Nos. 5,402,450 and 5,493,588. A multipath limitation method, such as described in the Lennen patent, op. cit., operates the early-minus-late autocorrelation tracking loop with a shorter delay between the early signal and late signal correlators than previous methods had employed. This limitation method reduces the effects of the presence of multipath substantially.

In one early-minus-late tracking method, a first correlator measures an equivalent autocorrelation function when the local replica signal is shifted to an "early" time $t_E$ relative to the position ($\tau=tp$) of an ideal or punctual replica, and a second correlator measures a second equivalent autocorrelation function when the local replica signal is shifted to a "late" time $t_L$. Early and late replicas of the punctual autocorrelation function $AC(\tau;P)$ are also illustrated in FIG. 1. By subtracting the late autocorrelation function from the early autocorrelation function, an autocorrelation tracking function or autocorrelation difference function $\Delta AC(\tau)$ with a zero crossing, corresponding to the autocorrelation function peak can be developed, if the separations of the early and late time shifts from the punctual time shift are chosen to be equal. This early-minus-late approach is not used here, because the focus is on quantitatively identifying a multipath signal, if one is present.

Superposition of an equivalent autocorrelation function for the multipath signal (reduced in magnitude and delayed in time) onto the autocorrelation function $AC(\tau)$ for the desired satellite code signal is a useful model for analyzing the effects of presence of multipath signals, as noted in the Fenton et al patent and in the Lennen patent, op. cit. Superposition of any additional signal onto the desired incoming signal, during the time period when signal correlation occurs, will distort the desired autocorrelation function $AC(\tau;\text{direct})$ and produce an altered autocorrelation function $AC(\tau;\text{composite})$ for the composite signal (direct plus multipath).

Figure 2A:
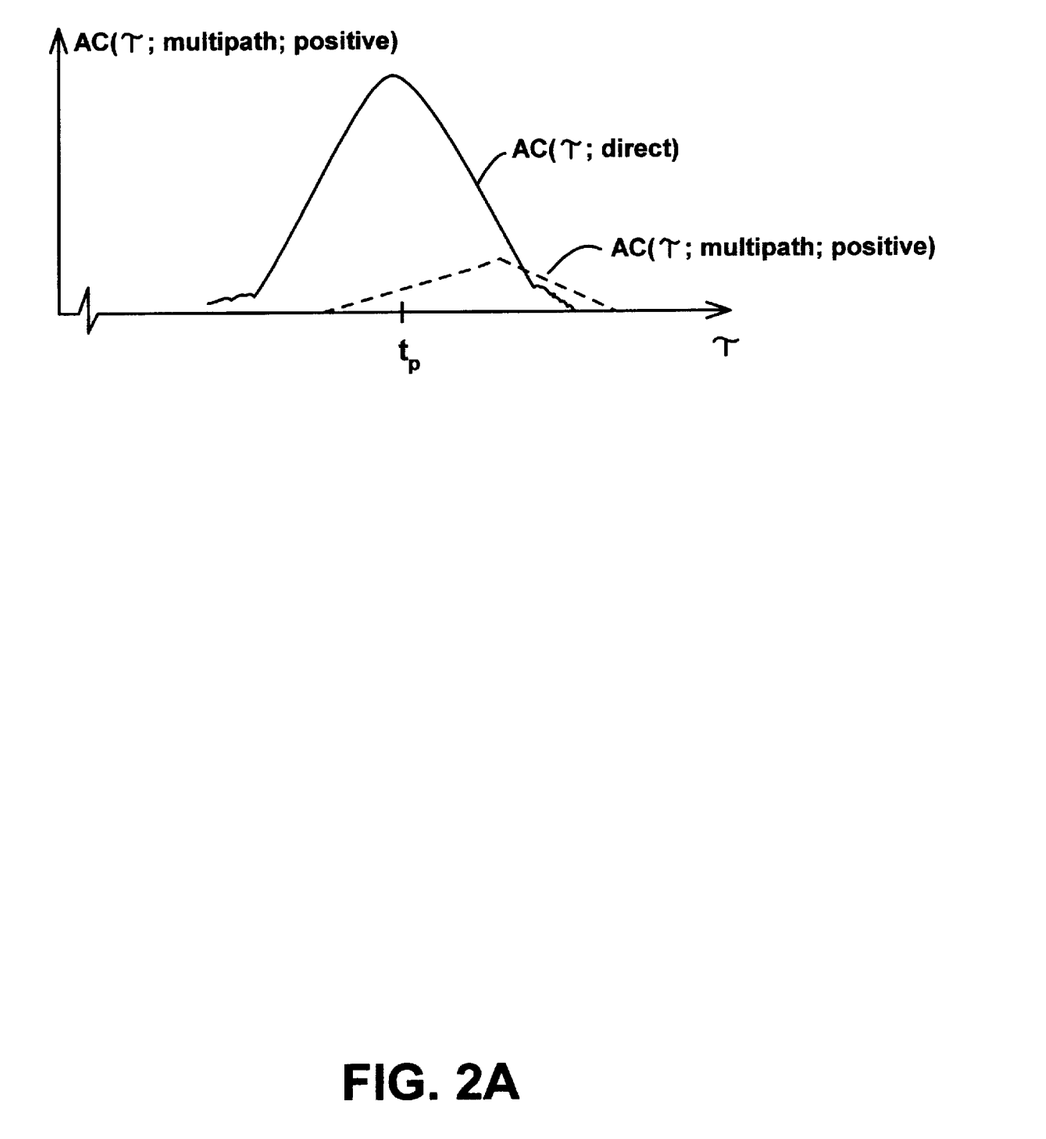
FIGS. 2A and 2C compare an autocorrelation function $AC0(\tau;direct)$, formed using only a direct signal with an autocorrelation function $AC0(\tau;multipath)$ formed using only a multipath signal, where the multipath signal has positive polarity and negative polarity, respectively, relative to the direct signal.
Figure 2B:
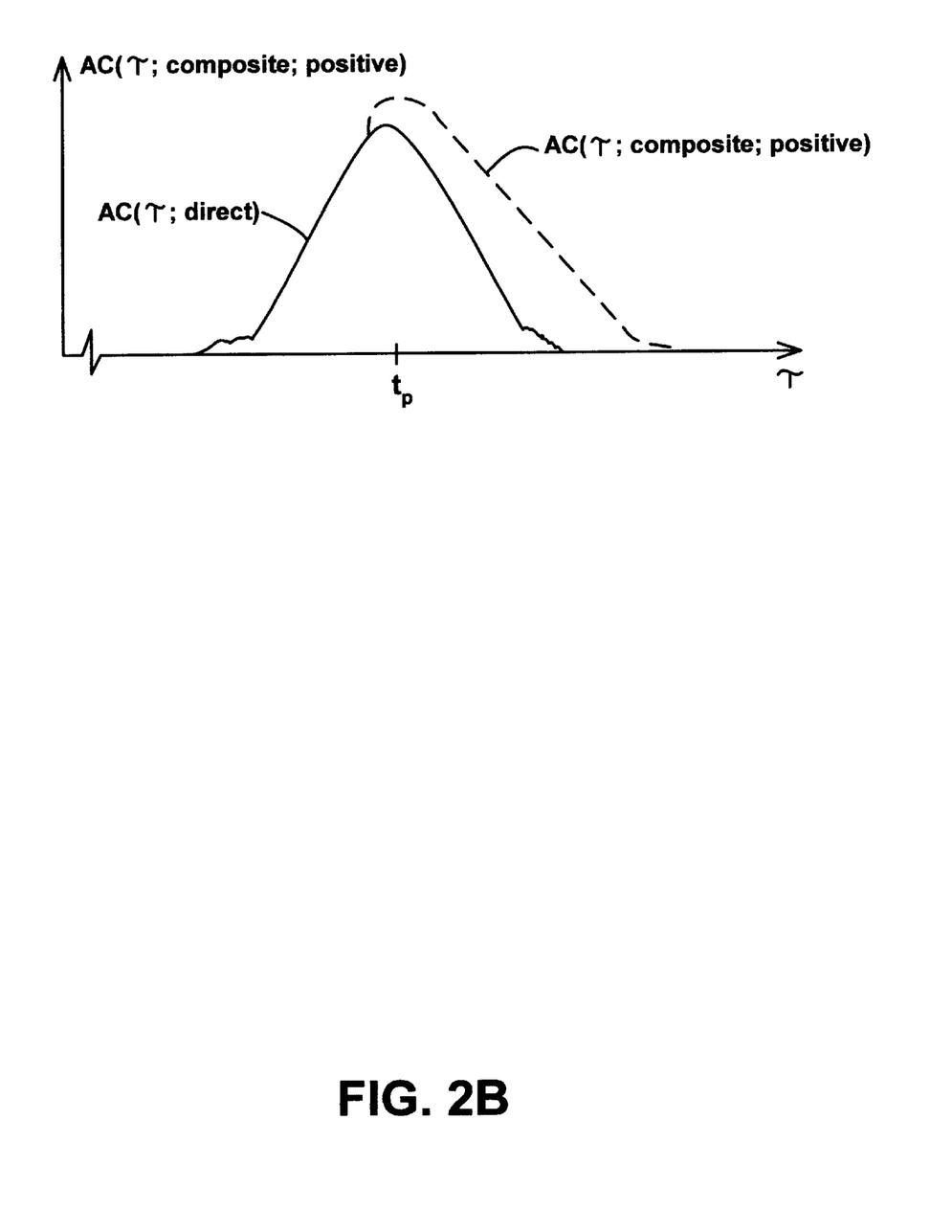
FIGS. 2B and 2D compare $AC0(\tau;direct)$ and $AC0(\tau;composite)$ for the respective FIGS. 2A and 2C.
Figure 2C:
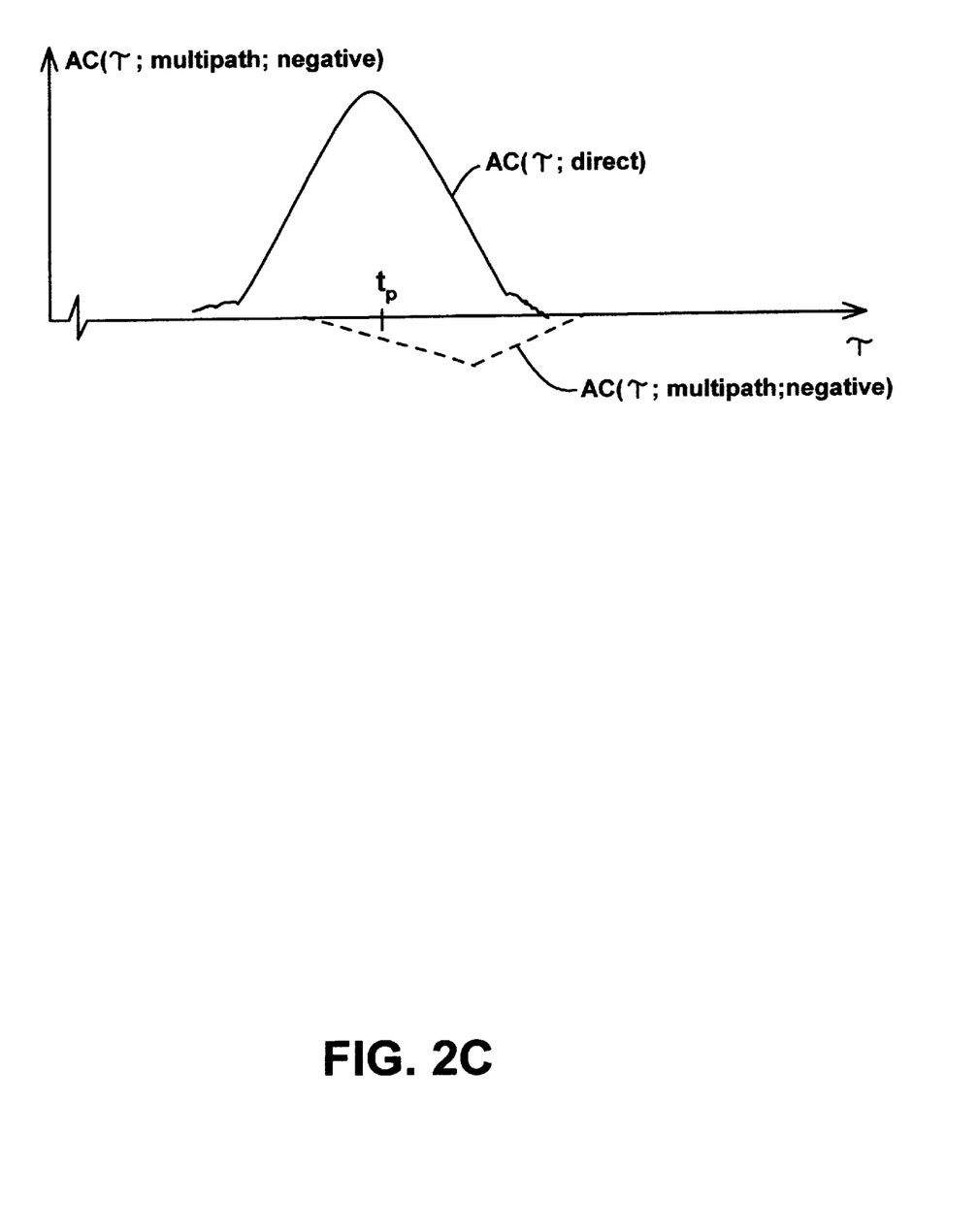
Figure 2D:
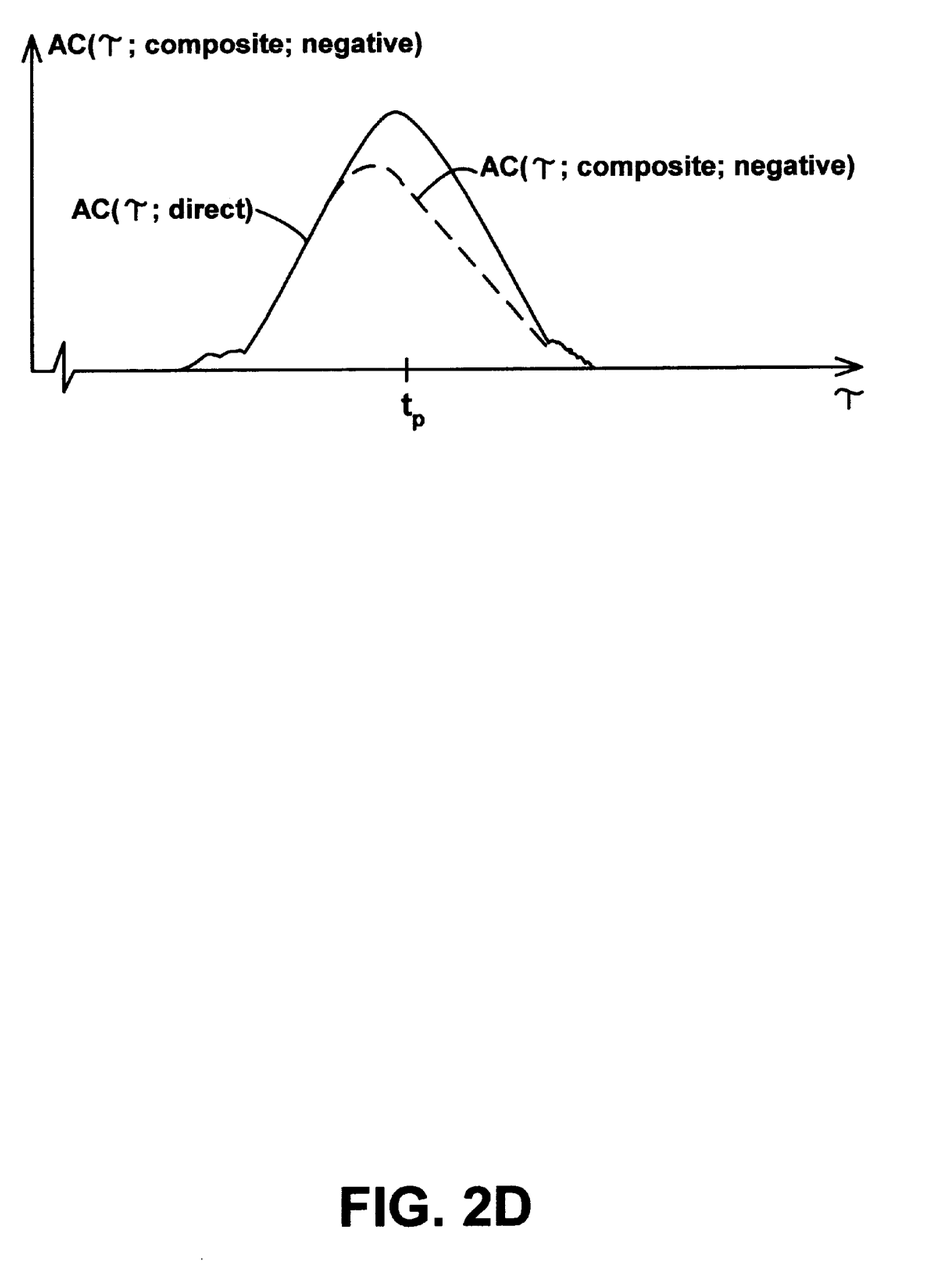

An autocorrelation function for an uncorrupted or "pure" direct signal is shown along with a representative, attenuated and time delayed, multipath autocorrelation function for positive relative polarity, compared to the direct signal, in FIG. 2A. The autocorrelation for the composite, corrupted incoming signal is obtained by summing the two autocorrelation functions and is compared with the uncorrupted autocorrelation function in FIG. 2B FIGS. 2C and 2D are similar graphs, showing the autocorrelation function for a multipath signal with negative relative polarity, compared to the direct signal. Any such distortion produces errors in the indicated zero-crossing point on the early-minus-late autocorrelation tracking function. These errors in indicated punctual time shift produce errors in the pseudorange measurements, and will in turn produce an error in the final computed estimate of location coordinates for the receiver.

Previous work in the area of multipath amelioration has focussed on two approaches: 1) estimating the effects and compensating for multipath-induced errors, and 2) attempting to limit or suppress the effects of the estimated multipath errors. In the Lennen patents, op. cit., both approaches are described. The estimation methods seek to model the distortions to the instantaneous autocorrelation function and to create a correction term to subtract from the indicated punctual time. Estimation methods are worthwhile but can never obtain perfection, wherein all multipath effects are removed, because the multipath signals are constantly varying and corrections can only be done after the fact. However, a major part of a multipath signal can often be removed by estimation, because a multipath signal often changes relatively slowly with time.

Several workers have analyzed autocorrelation functions and/or have used pseudorandom signal sequences in attempting to estimate or suppress the effects of the presence of multipath signals. Examples of this work is disclosed by Winters in U.S. Pat. No. 4,007,330, Tomlinson in U.S. Pat. No. 4,168,529, Bowles et al in U.S. Pat. Nos. 4,203,070 and 4,203,071, Guignon et al in U.S. Pat. No. 4,550,414, Dickey et al in U.S. Pat. No. 4,608,569, Liebowitz in U.S. Pat. No. 4,660,164, Borth et al in U.S. Pat. No. 4,829,543, McIntosh in U.S. Pat. No. 4,862,478, Broekhoven et al in U.S. Pat. No. 4,894,842, Wales in U.S. Pat. No. 5,091,918, Fenton et al in U.S. Pat. Nos. 5,101,416, 5,390,207, 5,414,729 and 5,495,499, Cai et al in U.S. Pat. No. 5,164,959, Scott et al in U.S. Pat. No. 5,282,228, Meehan in U.S. Pat. No. 5,347,536, Lennen in U.S. Pat. Nos. 5,402,450 and 5,493,588, Johnson et al in U.S. Pat. No. 5,444,451, Kuhn et al in U.S. Pat. No. 5,481,503, and Fox et al in U.S. Pat. No. 5,488,662.

These approaches do not determine or isolate multipath signal perturbations to a "clean" pseudorange signal and do not provide real time capability for initially identifying and assisting lock-on to, or for re-locking to, a given SATPS satellite. What is needed is an approach that allows code phase multipath signal errors to be determined quickly and quantitatively, in a time interval of length considerably less than one sec, that maintains portability of the SATPS ground equipment, and that is flexible enough to adapt to whatever is the present situation.

SUMMARY OF THE INVENTION

The need to identify and to eliminate or suppress the code phase multipath signals is met by the invention, which provides an analytical approach for estimation of the shift of the phase for peak amplitude of the code phase autocorrelation function, in terms of measured values of the code phase autocorrelation function, at early and/or late time points on a graph of the autocorrelation function. In an idealized environment, with no multipath present, an idealized autocorrelation function $AC_I(\tau)$ can be formed from a point-by-point product of the received satellite signal and a time-shifted, receiver-generated replica of a reference signal The voltage observed at the output terminal of a receiver correlator is given by a point on the graph of the autocorrelation function $AC_I(\tau)$, where $\tau$ represents a time shift between the incoming signal and the locally-generated reference signal. In the presence of one or more code phase multipath signals, the incoming signal is distorted by inclusion of one or more reflected and time-delayed incoming signals, and the ideal autocorrelation function $AC_I(\tau)$ is replaced by a measured autocorrelation function $AC_M(\tau)$ with a corresponding peak amplitude $AC_M(\tau_{M,p})$ at a punctual value $\tau=\tau_{M,p}$ for the time shift.

In general, three types of autocorrelation measurements are formed in an SATPS receiver: $AC_M(\tau_{M,p})$, representing a measurement at or near the peak amplitude of the measured autocorrelation function; $AC_M(\tau_{M,e})$, representing a measurement on the early side of the punctual value ($\tau_{M,e}<\tau_{M,p}$); and $AC_M(\tau_{M,l})$, representing a measurement on the late side of the punctual value ($\tau_{M,l}>\tau_{M,p}$). Here, it is required that $\tau_{M,p}-\tau_{M,e}=f1\Delta\tau_{chip}$ and that $\tau_{M,l}-\tau_{M,p}=f2\Delta\tau_{chip}$, where f1 and f2 are selected fractions ($0<f1<1$, $0<f2<1$)) and $\Delta\tau_{chip}$ is the temporal width of one bit in the digital signal received from the SATPS signal source. One additional constraint is imposed on the autocorrelation function values used here to estimate the effect of presence of multipath: either (i) $AC_M(\tau_{M,e})=AC_M(\tau_{M,p})>AC_M(\tau_{M,l})$ or (ii) $AC_M(\tau_{M,e})<AC_M(\tau_{M,p})=AC_M(\tau_{M,l})$.

When a multipath signal is present, the measured pseudorange value $PR(t;j;rcv)$ (roughly, the perceived distance from an SATPS signal source, such as a GPS signal-transmitting satellite number j, to an SATPS signal-receiving antenna) will differ from the pseudorange value that would be measured in the absence of the multipath signal, ceteris paribus. The pseudorange difference, written $\Delta PR(t;j;rcv)$, will vary with time t, with the number j of the satellite from which the signal is received and with the location of the antenna (indicated here by "rcv.") A multipath signal always arrives later than the corresponding direct signal with no multipath signal present. A multipath signal may have positive relative polarity or negative relative polarity, according as the magnitude of the composite signal (direct signal plus multipath signal) is greater than or less than the magnitude of the direct signal.

The invention expresses the pseudorange difference $\Delta PR(t;j;rcv)$ as a the product of a proportionality constant K and a ratio of a first linear combination of the measured amplitudes $AC_M(\tau_{M,e})$, $AC_M(\tau_{M,p})$ and $AC_M(\tau_{M,1})$ divided by a second linear combination of these three measured amplitudes. The proportionality constant K depends upon the SATPS satellite number j, upon the SATPS signal receiver/processor used, upon the selected fraction f and upon which linear combinations of the autocorrelation values are used in the numerator and the denominator of the ratio. Several different linear combinations can be used here in the numerator and in the denominator. The constant K may depend upon other, less important variables as well.

DESCRIPTION OF BEST MODES OF THE INVENTION

Figure 3:
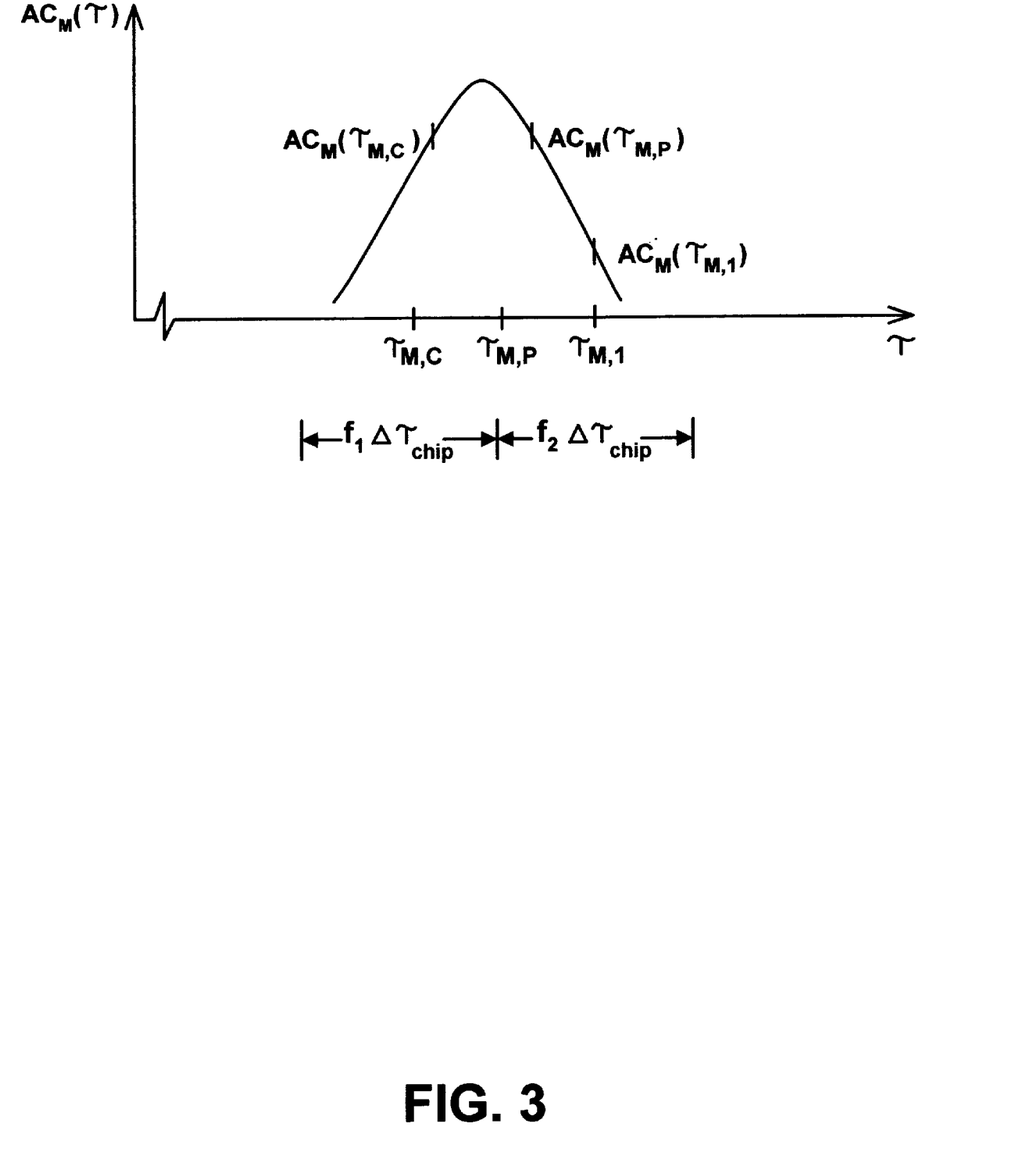
FIGS. 3 and 4 graphical views of two alternative choices of values of the measured autocorrelation function $AC_M(\tau)$ that can be used to implement the invention.

In a first embodiment of the invention, we have discovered that the pseudorange difference $PRC(t;j;rcv)=PR(t;j;rcv;multipath\ present)-PR(t;j;rcv;\ no\ multipath)$ for a given GPS satellite number j is approximately proportional to a first ratio R1

$$PRC(t;j;rcv)=K1\{[AC_M(\tau_{M,1})-AC_M(\tau_{M,p})]/AC_M(\tau_{M,p})\}^m=K1\ R1, \quad (2)$$

where m is a non-zero parameter, $AC_M(\tau_{M,e})=AC_M(\tau_{M,p})>AC_M(\tau_{M,1})$, $0<\tau_{M,p}-\tau_{M,e}=f1\Delta\tau_{chip}$ and $0<\tau_{M,1}-\tau_{M,p}=f2\Delta\tau_{chip}$, where f1 and f2 are selected fractions of a chip width $\Delta\tau_{chip}$ ($0<f1<1, 0<f2<1$), as illustrated in FIG. 3. One can choose f1=f2 here. Here, the "punctual" value $AC_M(\tau_{M,p})$ need not correspond to the peak value of the autocorrelation function. The only requirement for this "punctual" value is that the time shift value $\tau_{M,p}$ satisfy the constraints $\tau_{M,e}<\tau_{M,p}<\tau_{M,1}$. The proportionality constant $K1=K1(m;f1;f2;j;rcv)$ depends primarily upon the parameter m, upon the fractions f1 and f2 chosen, upon the SAPTS satellite number j, and upon the antenna and receiver filter characteristics of the SATPS signal receiver/processor and does not depend upon the three autocorrelation values $AC_M(\tau_{M,e})$, $AC_M(\tau_{M,p})$ or $AC_M(\tau_{M,1})$. Parameter choices such as m=1 or 2 are suitable, but the choice of m is not restricted to these parameter values.

Figure 4:
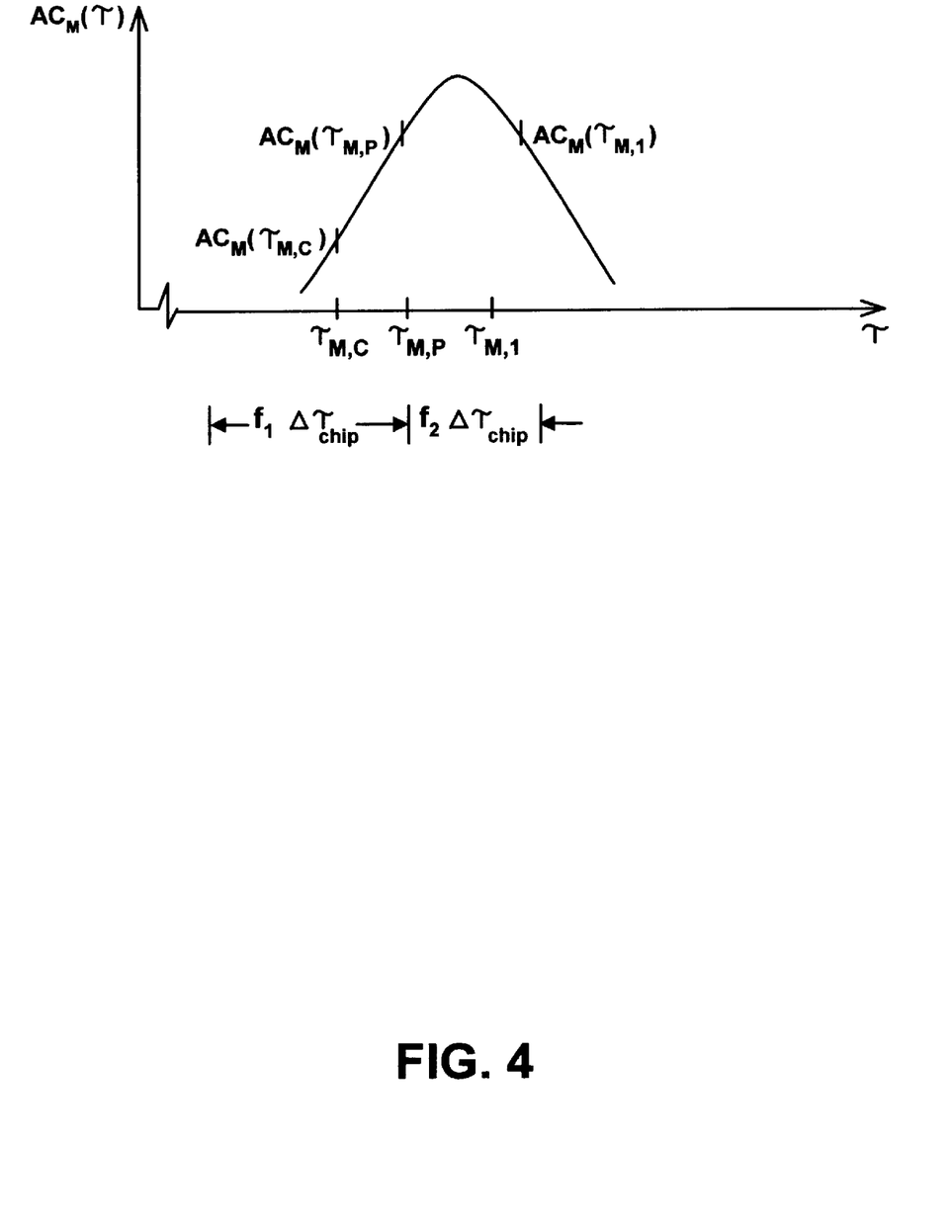

In a second embodiment of the invention, we have discovered that the pseudorange difference $PRC(t;j;rcv)$ is also approximately proportional to a second ratio R2

$$PRC(t;j;rcv)=K2\{[AC_M(\tau_{M,p})-AC_M(\tau_{M,e})]/AC_M(\tau_{M,p})\}^m=K2\ R2, \quad (3)$$

where m is a non-zero parameter, $AC_M(\tau_{M,p})=AC_M(\tau_{M,1})>AC_M(\tau_{M,e})$, $\tau_{M,p}-\tau_{M,e}=f1\Delta\tau_{chip}$ and $\tau_{M,1}-\tau_{M,p}=f2\Delta\tau_{chip}$, as illustrated in FIG. 4. The proportionality constant $K2=K2(m;f1;f2;j;rcv)$ depends primarily upon the parameter m, upon the fractions f1 and f2 chosen, upon the SATPS satellite number j, and upon the antenna and receiver filter characteristics of the SATPS signal receiver/processor and does not depend upon the three autocorrelation values $AC_M(\tau_{M,e})$, $AC_M(\tau_{M,p})$ or $AC_M(\tau_{M,1})$.

In a third embodiment of the invention, we have discovered that the pseudorange difference $PRC(t;j;rcv)$ is approximately proportional to a third ratio R3 of a first linear combination of the three autocorrelation values $AC_M(\tau_{M,x})$ (x=e, p, 1) divided by a second linear combination of these three autocorrelation values, viz.

$$PRC(t;j;rcv)=K3\ \{[a1\ AC_M(\tau_{M,e})+a2\ AC_M(\tau_{M,p})++a3\ AC_M(\tau_{M,1})]/[b1\ AC_M(\tau_{M,e})+b2\ AC_M(\tau_{M,p})++b3\ AC_M(\tau_{M,1})]\}^m=K3\ R3, \quad (4)$$

where m is a non-zero parameter, a1, a2 and a3 are selected constants, not all zero, and b1, b2 and b3 are selected constants, not all zero. In the situations of most interest, the value of each of the parameters a1, a2, a3, b1, b2 and b3 will be equal to $-1$, 0 or 1, although other choices of these parameter values can be made.

The constraints $\tau_{M,p}-\tau_{M,e}=f1\Delta\tau_{chip}$ and $\tau_{M,1}-\tau_{M,p}=f2\Delta\tau_{chip}$ are imposed as in the first and second embodiments. The proportionality constant $K3=K3(m;f1;f2;j;rcv;a1;a2;a3;b1;b2;b3)$ depends primarily upon the parameter m, upon the fractions f1 and f2, upon the SATPS satellite number j, upon the antenna and receiver filter characteristics of the SATPS signal receiver/processor, and upon the six linear combination constants a1, a2, a3, b1, b2 and b3, and does not depend upon the three autocorrelation values. Here, autocorrelation values chosen according to FIG. 3 or according to FIG. 4 may be used in this embodiment. The fractions f1 and f2 used in any of the first, second and third embodiments may lie in the range $0<f<0.50$, preferably in the range $0<f<0.08$, and more preferably in the range $0<f<0.04$.

In any of the first, second and third embodiments, the fractions f1 and f2 are independently selected and need not be equal to each other. For example, one could choose f1=0.04 and f2=0.0575 or f1=0.06 and f2=0.03. Preferably, f1 and f2 are each chosen to be no greater than 0.08, although wider correlator spacings can be used With such inclusion of two fractions f1 and f2, the proportionality coefficient K1 or K2 or K3 in Eqs. (2), (3) or (4) will change appropriately.

Alternatively, two of the time shift values $\tau_{M,e}$, $\tau_{M,p}$ and $\tau_{M,1}$ can be chosen so that one of the relations $$\alpha AC_M(\tau_{M,e})-(1-\alpha)\ AC_M(\tau_{M,p})=0, \quad (5)$$

$$\beta AC_M(\tau_{M,p})-(1-\beta)\ AC_M(\tau_{M,1})=0 \quad (6)$$

is satisfied, where $\alpha$ and/or $\beta$ is a selected real number lying between 0 and 1. The choice $\alpha=0.5$ or $\beta=0.5$ enforces equality in Eq. (5) or (6).

Estimates for the pseudorange corrections PRC(t;j;rcv) can also be obtained from any one of the relations $$PRC(t;j;rcv)=K1'\{[AC_M(\tau_{M,1})-AC_M(\tau_{M,p})]/AC_M(\tau_{M,p})\}^m+K1''= K1'R1+K1'', \quad (7)$$

$$PRC(t;j;rcv)=K2'\{[AC_M(\tau_{M,p})-AC_M(\tau_{M,e})]/AC_M(\tau_{M,p})\}^m+K2''= K2'R2+K2'', \quad (8)$$

$$PRC(t;j;rcv)=K3'\{[a1\ AC_M(\tau_{M,e})+a2\ AC_M(\tau_{M,p})+$$
$$+a3\ AC_M(\tau_{M,1})]/[b1\ AC_M(\tau_{M,e})+b2\ AC_M(\tau_{M,p})+$$
$$+b3\ AC_M(\tau_{M,1})]\}^m+K3''=K3'R3+K3'', \quad (9)$$

where K1', K1", K2', K2", K3' and K3" are determinable constants that are substantially independent of the character of the multipath signal(s) present.

The constants K1", K2" and K3" are interpretable as multipath estimator biases, due to a distortion of the autocorrelation function $AC_M(\tau_{M,x})$ (x=e, p, 1). In the unlikely event that measurements from all satellites produce the same bias, the additive term K1", K2" or K3" would appear as a constant additive term in the clock term of the navigation solution. However, different PRN codes will probably produce different estimator biases that must be accounted for separately to avoid biased location solutions or biased differential corrections. These biases are produced by a variety of sources, including the differing and non-infinite bandwidth of the GPS signal receiver.

If the Gold codes used for the PRN coding for the different satellites are analyzed, one finds that, at a displacement of time shift τ (Eqs. (1) and (2)) away from optimum correlation, where $AC_M(\tau_M)$ attains its maximum value, three classes of autocorrelation functions occur: (1) a class with approximately 0 percent correlation offset; (2) a class with approximately +6 percent correlation offset; and (3) a class with approximately −6 percent correlation offset. The correlation offsets for 32 GPS satellites contemplated are set forth in Table 1. Each of these three classes produces autocorrelation functions with the familiar triangular shape, but with different triangular slopes. The multipath estimator used in any of Eqs. (2), (3), (4), (7), (8) and (9) is effectively measuring this slope, and differences in the slopes for the three classes of autocorrelation functions are reflected in different values for the bias estimators K1", K2" and K3".

TABLE 1

| | Correlator Offsets | | | | |
|---|---|---|---|---|---|
| PRN | Difference from ideal | | PRN | Difference from ideal | |
| Number | at ±1 chip | ±2 chips | Number | at ±1 chip | ±2 chips |
| 1 | 0% | 0% | 17 | +6% | +6% |
| 2 | 0 | 0 | 18 | 0 | +6 |
| 3 | 0 | 0 | 19 | 0 | −6 |
| 4 | 0 | −6 | 20 | 0 | 0 |
| 5 | 0 | 0 | 21 | +6 | 0 |
| 6 | 0 | −6 | 22 | −6 | 0 |
| 7 | +6 | 0 | 23 | 0 | 0 |
| 8 | −6 | +6 | 24 | +6 | −6 |
| 9 | 0 | 0 | 25 | 0 | 0 |
| 10 | 0 | +6 | 26 | 0 | 0 |
| 11 | 0 | 0 | 27 | 0 | 0 |
| 12 | 0 | 0 | 28 | 0 | −6 |
| 13 | 0 | 0 | 29 | 0 | 0 |
| 14 | 0 | 0 | 30 | 0 | +6 |
| 15 | +6 | 0 | 31 | 0 | 0 |
| 16 | 0 | −6 | 32 | 0 | 0 |

TABLE 1-continued

The values of the bias estimators K1", K2" and K3" have been determined by simulation and are approximately −4.84 (meters), −5.18 (meters) and −5.49 (meters) for GPS satellites with −6 percent, 0 percent and +6 percent bias (bias signum opposite to the correlation offset signum), respectively, at ±1 chip, for the PRC estimator in Eq. (2) with m=1. The bias estimators K1", K2" and K3" may vary somewhat with the choice of the parameters a1, a2, a3, b1, b2, b3 and m in Eq. (4).

A new estimate of the pseudorange difference PRC (t;j;rcv) can be provided as often as once every 200 msec, or more often if needed. Optionally, a signal processing filter is provided with a bandwidth that varies with estimated signal-to-noise ratio (SNR) for the incoming signal(s). Where the SNR is relatively low (≈34 dBHz), the bandwidth is optionally set to 0.1 Hz to provide some signal averaging. For higher SNR, the bandwidth can be increased quickly to 1 Hz, or even higher, depending upon the code tracking bandwidth. Further, an optimized bandwidth can be selected, based upon an a priori estimated multipath frequency.

The multipath filter bandwidth used here was chosen after some experimentation. The standard code tracking bandwidth is 1 Hz. If the rate of change with time of a multipath signal becomes much greater than 1 Hz, this perturbation will resemble Gaussian noise and will be substantially removed by the code bandwidth filter. The multipath estimator set forth in Eqs. (2), (3), (4), (7), (8) and (9) estimates, and thereby facilitates removal of, multipath signals that vary more slowly than 1 Hz. If the multipath estimate is unfiltered, the Gaussian noise portion of the multipath estimate may become large enough to corrupt the pseudorange values when the pseudorange corrections PRC are applied. If the filter bandwidth is made too small (say, bandwidth <0.1 Hz), the filter will be unable to track more rapid variations in the multipath signal and will introduce an unacceptably large time lag in the multipath correction.

A preferred multipath filter bandwidth of BW(filter) between 0.1 Hz and 1 Hz is selected by using some reasonable assumptions about typical rates of change of multipath signals, by consulting the technical literature that reports these rate of change values, and by measurements using commercially available GPS receiver/processors, such as Trimble 4000SSI and Trimble 7400MSi. This preferred bandwidth is a compromise. At relatively low SNR values, a lower multipath filter bandwidth, such as 0.1–0.2 Hz is used to suppress excessive Gaussian noise in the estimate of the multipath signal contribution. The time lag in pseudorange correction with this bandwidth choice will be greater than the time lag for a choice BW(filter) ≈1 Hz.

One enhancement of this approach allows the filter bandwidth BW(filter) to vary dynamically according to an estimate of the present rate of change of the multipath signal: BW(filter) is increased (decreased) as the multipath signal rate of change decreases (increases). Alternatively, multipath signals for a given receiver, having location coordinates that are known with great accuracy, could be analyzed over a time interval of length 24 hours or more, and a fixed, optimal filter bandwidth can be selected based upon Fourier analysis of the multipath signals received during that interval.

This invention uses at most three measured autocorrelation values $AC_M(\tau_{M,e})$, $AC_M(\tau_{M,p})$ and $AC_M(\tau_{M,l})$, with the middle autocorrelation value $AC_M(\tau_{M,p})$ being arranged to be equal to one of the other two autocorrelation values in one embodiment and the three time shift values $\tau_{M,e}$, $\tau_{M,p}$ and $\tau_{M,l}$ being preferably (but not necessarily) uniformly spaced apart by a selected fraction of the chip width.

The proportionality constant K1, K2 or K3 used in Eq. (2), (3) or (4) has a theoretical value that is determinable from examination of an idealized autocorrelation function $AC_I(\tau_t)$ that would be received in the absence of multipath and in the absence of atmospheric perturbations on the pseudorange measured at the user's SATPS signal antenna. For example, if the fraction f=0.04 is chosen, the theoretical proportionality constant for the FIG. 1 configuration would be K1=299.74 (meters), if the bandwidth were infinite. The theoretical values for K1 for the 24 GPS satellites now in orbit vary from about 290 to about 300 (meters).

The theoretical constant K1 (or K2 or K3) may differ slightly from one SATPS satellite number j to another and from one SATPS signal receiver/processor to another. An empirically determined value of K1 (or K2 or K3) will differ somewhat from the theoretical value, because of the effects of non-infinite bandwidth for the GPS signal receiver, atmospheric disturbances and other factors. An empirical value of K1, K2 and/or K3 can be measured or calibrated at the time the satellite transmitter is constructed and may be remeasured or recalibrated at a GPS station. A GPS simulator can be used to (re)calibrate as well. However, a simulator cannot include the effects of manufacturing tolerances or of environmental conditions, such as temperature, on the measurements.

Figure 5:
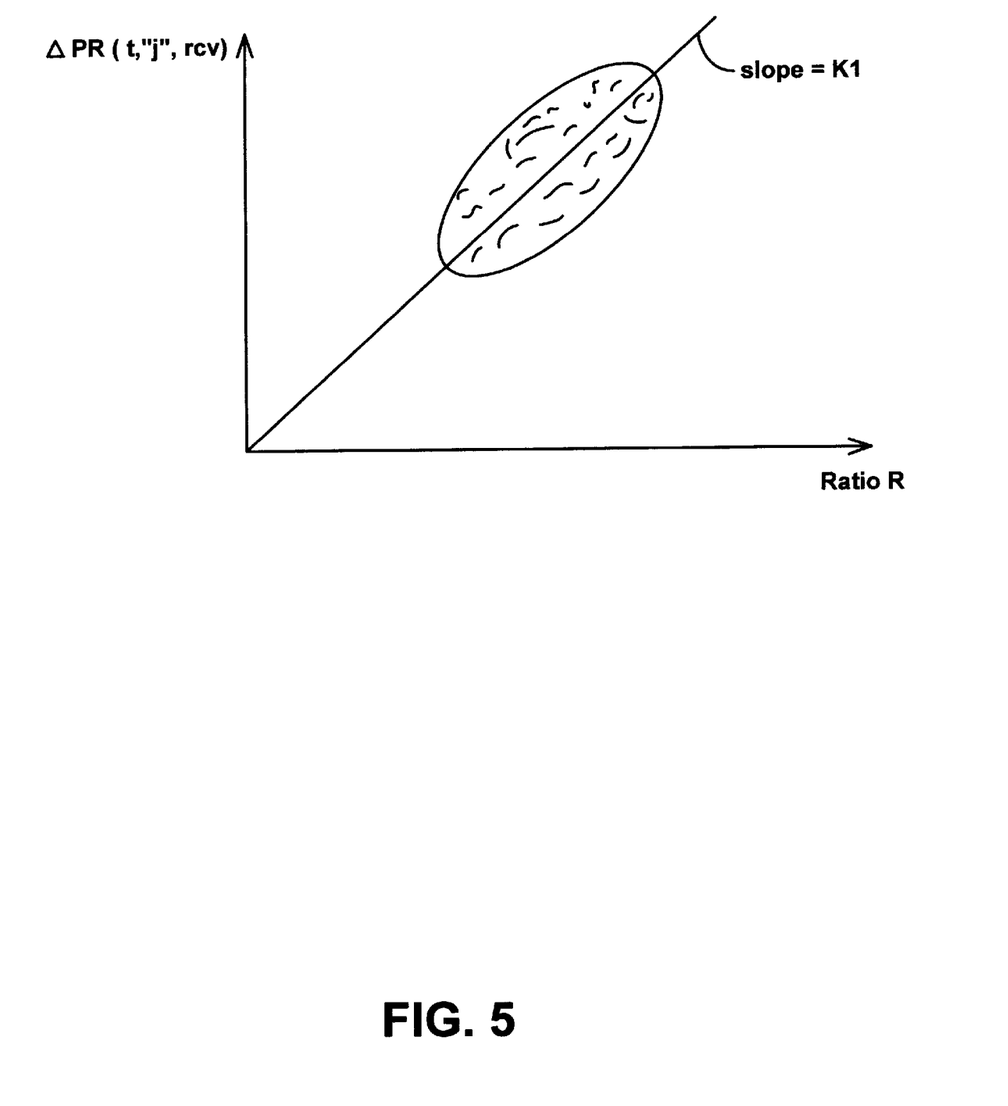
FIG. 5 graphically illustrates a typical scatter diagram that may be used to determine the value of a proportionality constant used in the invention.

FIG. 5 is a scatter diagram schematically illustrating calculated pseudorange difference $\Delta PR(t;j;rcv)$ versus the ratio shown in Eq. (2), computed from autocorrelation values $AC_M(\tau_{M,x})$ (x=e, p, l) where a multipath signal is controllably introduced to form a composite signal. The proportionality constant K1 is determined as the gradient or slope of a line drawn through the origin and through the scatter diagram points. In practice, an average value of the proportionality constant K1' (or K2' or K3') is determined from a scatter diagram such as FIG. 3 and is used in Eq. (1) (or Eq. (2) or Eq. (3)).

After the pseudorange corrections PRC(t;j;rcv) due to multipath signal contributions are determined, these corrections are combined with the uncorrected pseudorange values to produce corrected pseudorange values, where the times of arrival of the SATPS signals are closer to the correct times of arrival that would prevail in the absence of perturbations such as multipath signals. Other pseudorange corrections due to ionospheric and tropospheric time delay and other contributions can also be identified and combined with the uncorrected pseudorange values, to obtain corrected pseudorange values. Corrected values for the location coordinates, velocity coordinates, receiver clock offset and related variables can then be determined and displayed from the corrected pseudorange values, using well known methods. The corrected pseudorange values are then used to determine the location coordinates and/or the time of observation at the user antenna, using methods that are well known in this technical art. The antenna and receiver/processor employed by the user are the standard GPS signal antenna and GPS signal receiver/processor, where the receiver/processor includes a computer that is programmed to perform the preceding analysis.

The preceding analysis has been applied to GPS signals but can be applied to GLONASS signals or to signals received from any other SATPS satellites. Reference to a Satellite Positioning System (SATPS) herein refers to a Global Positioning System (GPS), to a Global Orbiting Navigation Satellite System (GLONASS), and to any other compatible satellite-based system that provides information by which an observer's position and the time of observation can be determined, all of which meet the requirements of the present invention.

A Satellite Positioning System (SATPS), such as GPS or GLONASS, uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS. A configuration of two or more receivers can be used to accurately determine the relative positions between the receivers or stations. This method, known as differential SATPS positioning, is far more accurate than absolute positioning, provided that the distances between these stations are substantially less than the distances from these stations to the satellites, which is the usual case. Differential SATPS positioning can be used for survey or construction work in the field, providing location coordinates and distances that are accurate to within a few centimeters.

In differential SATPS position determination, many of the errors in the SATPS that compromise the accuracy of absolute position determination are similar in magnitude for stations that are physically close. The effect of these errors on the accuracy of differential SATPS position determination is therefore substantially reduced by a process of partial error cancellation.

The pseudorange and carrier phase signals received from a satellite number j by an antenna at an SATPS station number i are expressed as $$PR(t;i;j)=R(t;i;j)+SCB(t;j)+RCB(t;i)+\tau_T(t;i;j)+\tau_I(t;i;j)+m(t;i;j)+\eta(t;i;j), \quad (10)$$

$$\Phi(t;i;j)=\lambda N(i;j)+R(t;i;j)+SCB(t;j)+RCB(t;i)+\tau_T(t;i;j)-\tau_I(t;i;j)+m'(t;i;j)+\eta'(t;i;j), \quad (11)$$

where R(t;i;j) ("SATPS range") and $\Phi(t;i;j)$ (carrier phase) represent the "true" range from the station number i to the satellite number j at the time t and the corresponding carrier phase, as determined from the SATPS navigation ephemeris (or almanac information) received by the SATPS station i, $\lambda$ is the SATPS carrier signal wavelength, and N(i;j) is the integer number of wavelengths associated with the carrier phase signal. The number N is initially ambiguous; but once N is found it does not change with time as long as continuous carrier lock is maintained. The carrier phase signal $\Phi(t;i;j)$ is obtained from analysis of integrated Doppler shifts of the SATPS signals received and includes error contributions from the sources indicated on the right hand side of Eq. (11). Here, SCB(t;i;j) is the satellite clock bias error, RCB(t;i;j) is the receiver clock bias error, $\tau_T(t;i;j)$ and $\tau_I(t;i;j)$ are the tropospheric signal propagation time delay and ionospheric signal propagation time delay, m(t;i;j) and m'(t;i;j) are the multipath signal error contributions for the pseudorange and carrier phase signals, and $\eta(t;i;j)$ and $\eta'(t;i;j)$ are the receiver noise error contributions for the pseudorange and carrier phase signals.

What is claimed is:

1. A method of synchronizing to a reference signal the timing of a received composite, code phase SATPS signal, the composite signal consisting of a preferred, interference-free signal distorted by at least one interfering signal, to determine an undistorted timing point of the preferred signal, the method comprising the steps of:

(1) receiving at a user receiver a composite code phase SATPS signal including a preferred, interference-free, direct digital signal and at least one interfering digital signal, where the preferred digital signal has a selected signal bit length of $\Delta^\tau$chip;

(2) generating an autocorrelation function $AC_M(\tau)$ representing a timing relationship between the composite signal and a selected reference signal and that depends upon the value of a time shift variable $\tau$ between the composite signal and the selecting reference signal;

(3) determining at least two of three autocorrelation amplitudes $AC_M(^\tau M,e)$, $AC_M(^\tau M,p)$ and $AC_M(^\tau M,1)$ and at least two of three corresponding code phase time shift values $^\tau M,e$, $^\tau M,p$ and $^\tau M,1$ that satisfy the relations $^\tau M,e < ^\tau M,p < ^\tau M,1$ and $^\tau M,p - ^\tau M,e = ^{f1\Delta\tau}$chip and $^\tau M,1 - ^\tau M,p = ^{f2\Delta\tau}$chip, where f1 and f2 are independently selected fractions, satisfying $0 \leq f1 < 0.5$ and $0 \leq f2 < 0.5$, and the autocorrelation amplitudes (i) satisfy the relation (i) $\alpha AC_M(^\tau M,e) = (1-\alpha) AC_M(^\tau M,p) > AC_M(^\tau M,1)$ or (ii) satisfy the relation $\beta AC_M(^\tau M,p) = (1-\beta) AC_M(^\tau M,1) > AC_M(^\tau M,e)$, where $\alpha$ and $\beta$ is an independently selected fraction lying between 0 and 1;

(4) estimating a pseudorange value shift PRC (t;j;rcv) in a pseudorange value associated with the preferred signal, measured at the user receiver, from at least one SATPS signal source, number j, by the relation
   $PRC(t;j;rcv) = K'\{[a1\ AC_M(^\tau M, e) + a2\ AC_M(^\tau M,P) + +a3\ AC_{M'}(^\tau M,l)]/[b1\ AC_M(^\tau M, e) + b2\ AC_M(^\tau M,P) + +b3\ AC_{M'}(^\tau M,l)]\}m + K''$, where m is a selected non-zero parameter, a1, a2 and a3 are selected parameters, not all zero, b1, b2 and b3 are selected parameters, not all zero, and K' and K'' are selected parameters that are independent of the values $AC_M(^\tau M, e)$, $AC_M(^\tau M,p)$, $AC_M(^\tau M,1)$, $^\tau M, e$, $^\tau M,p$ and $^\tau M,1$ and that may depend upon the selected fractions f1 and A2, upon the selected fraction $\alpha$ or $\beta$, upon the SATPS satellite number j, upon the characteristics of the receiver, and upon one or more of the selected parameters m, a1, a2, a3, b1, b2 and b3;

(5) determining a pseudorange value PR (t;j;rcv) for the SATPS signal number j received at the user receiver with the pseudorange shift PRC (t;j;rcv) removed from the pseudorange value; and (6) utilizing results obtained via at least one of said steps (1) through (5) to synchronize to said selected reference signal said timing of said received composite, code phase SATPS signal.

2. The method of claim 1, further comprising the step of choosing the value of each of said selected parameters a1, a2, a3, b1, b2 and b3 from the set of values consisting of −1, 0 and +1.

3. The method of claim 1, further comprising the steps of:

selecting said autocorrelation amplitudes $AC_M(\tau_{M,e})$, $AC_M(\tau_{M,p})$ and $AC_M(\tau_{M,l})$ to satisfy the relations $AC_M(\tau_{M,e}) = AC_M(\tau_{M,p}) > AC_M(\tau_{M,1})$; and selecting said parameters K'', a1, a2, a3, b1, b2 and b3 to satisfy K''=0, a1=0, a2=1, a3=−1, b1=0, b2=1 and b3=0 so that said pseudorange value shift PRC(t;j;rcv), measured at said user receiver, from at least one SATPS signal source j is determined by the relation
   $PRC(t;j;rcv) = K'\{[AC_M(\tau_{M,p}) - AC_M(\tau_{M,l})]/AC_M(\tau_{M,p})\}^m$.

4. The method of claim 1, further comprising the steps of:

selecting said correlation amplitudes $AC_M(\tau_{M,e})$, $AC_M(\tau_{M,p})$ and $AC_M(\tau_{M,l})$ to satisfy the relations $AC_M(\tau_{M,p}) = AC_M(\tau_{M,1}) > AC_M(\tau_{M,e})$; and selecting said parameters K'', a1, a2, a3, b1, b2 and b3 to satisfy K''=0, a1=−1, a2=1, a3=0, b1=0, b2=1 and b3=0 so that said pseudorange value shift PRC(t;j;rcv), measured at said user receiver, from at least one SATPS signal source j is determined by the relation
   $PRC(t;j;rcv) = K'\{[AC_M(\tau_{M,p}) - AC_M(\tau_{M,e})]/AC_M(\tau_{M,p})\}^m$.

5. The method of claim 1, further comprising the step of choosing said fractions f1 and f2 to be equal to each other.

6. The method of claim 1, further comprising the step of choosing the value f of at least one of said fractions f1 and f2 to lie in the range $0 \leq f < 0.08$.

7. The method of claim 1, further comprising the step of choosing at least one of said selected fraction $\alpha = 0.5$ or said fraction $\beta = 0.5$.

8. The method of claim 1, further comprising the step of choosing said selected parameter m to be equal to 1.

9. The method of claim 1, further comprising the step of choosing said selected parameter K'' to be substantially zero.

10. The method of claim 1, further comprising the step of choosing said selected parameter K'' (meters) to be approximately −4.84, −5.18 or −5.49, depending upon said SATPS source number j.

11. Apparatus for synchronizing to a reference signal the timing of a received composite, code phase SATPS signal, the composite signal consisting of a preferred, interference-free signal distorted by at least one interfering signal, to determine an undistorted timing point of the preferred signal, the apparatus comprising:

a user antenna and user receiver, including a computer, that receive a composite code phase SATPS signal including a preferred, interference-free, direct digital signal and at least one interfering digital signal, where the preferred digital signal has a selected signal bit length of $\Delta^\tau$chip, where the computer is programmed to:

(1) generate an autocorrelation function $AC_M(\tau)$ representing a timing relationship between the composite signal and a selected reference signal and that depends upon the value of a time shift variable t between the composite signal and the selecting reference signal;

(2) determine at least two of three autocorrelation amplitudes $AC_M(^\tau M, e)$, $AC_M(^\tau M,p)$ and $AC_M(^\tau M,1)$ and at least two of three corresponding code phase time shift values $^\tau M$, $e^{\tau}M,p$ and $^\tau M,1$ that satisfy the relations $^\tau M,e < ^\tau M,p < ^\tau M,1$ and $^\tau M,p - ^\tau M,e = ^{f1\Delta\tau}$chip and $^\tau M,1 - ^\tau M,p = ^{f1\Delta\tau}$chip, where f1 and f2 are independently selected fractions, satisfying $0 \leq f1 < 0.5$ and $0 \leq f2 < 0.5$, and the autocorrelation amplitudes (i) satisfy the relation (i) $\alpha AC_M(^\tau M,e) = (1-x)AC_M(^\tau M,p) > AC_M(^\tau M,1)$ or (ii) satisfy the relation $\beta AC_M(^\tau M,p) = (1-\beta) AC_M(^{\tau M,l}) > AC_M(^\tau M,e)$, where $\alpha$ and $\beta$ is an independently selected fraction lying between 0 and 1;

(3) estimate a pseudorange value shift PRC (t;j;rcv) in a pseudorange value associated with the preferred signal, measured at the user receiver, from at least one SATPS signal source, number j, by the relation
   $PRC(t;j;rcv) = K'\{[a1\ AC_M(^\tau M, e) + a2\ AC_M(^\tau M,P) + + a3AC_M(^\tau M,1)]/[b1\ AC_M(^\tau M, e) + b2\ AC_M(^\tau M,P) + +b3$ $AC_M(^\tau M,1)]\}m+K''$, where m is a selected non-zero parameter, a1, a2 and a3 are selected parameters, not all zero, b1, b2 and b3 are selected parameters, not all zero, and K' and K'' are selected parameters that are independent of the values $AC_M(^\tau M, e)$, $AC_M(^\tau M,p)$, $AC_M(^\tau M,1)$, $^\tau M$, e, $^\tau M,p$ and $^\tau M,1$ and that may depend upon the selected fractions f1 and f2, upon the selected fraction α or β, upon the SATPS satellite number j, upon the characteristics of the receiver, and upon one or more of the selected parameters m, a1, a2, a3, b1, b2 and b3;

(4) determine a pseudorange value PR (t;j;rcv) for the SATPS signal number j received at the user receiver with the pseudorange shift PRC (t;j;rcv) removed from the pseudorange value; and (5) utilizing results obtained via at least one of said steps (1) through (4) to synchronize to said selected reference signal said timing of said received composite, code phase SATPS signal.

12. The apparatus of claim 11, wherein the value of each of said selected parameters a1, a2, a3, b1, b2 and b3 is chosen from the set of values consisting of −1, 0 and +1.

13. The apparatus of claim 11, wherein:

said autocorrelation amplitudes $AC_M(\tau_{M,e})$, $AC_M(\tau_{M,p})$ and $AC_M(\tau_{M,l})$ are chosen to satisfy the relations $AC_M(\tau_{M,e})=AC_M(\tau_{M,p})>AC_M(\tau_{M,l})$; and said parameters K'', a1, a2, a3, b1, b2 and b3 are chosen to satisfy K''=0, a1=0, a2=1, a3=−1, b1=0, b2=1 and b3=0 so that said pseudorange value shift PRC(t;j;rcv), measured at said user receiver, from at least one SATPS signal source j is determined by the relation $PRC(t;j;rcv)=K'\{[AC_M(\tau_{M,p})-AC_M(\tau_{M,l})]/AC_M(\tau_{M,p})\}^m$.

14. The apparatus of claim 11, wherein:

said correlation amplitudes $AC_M(\tau_{M,e})$, $AC_M(\tau_{M,p})$ and $AC_M(\tau_{M,l})$ are chosen to satisfy the relations $AC_M(\tau_{M,p})=AC_M(\tau_{M,l})>AC_M(\tau_{M,e})$; and said parameters K'', a1, a2, a3, b1, b2 and b3 are chosen to satisfy K''=0, a1=−1, a2=1, a3=0, b1=0, b2=1 and b3=0 so that said pseudorange value shift PRC(t;j;rcv), measured at said user receiver, from at least one SATPS signal source j is determined by the relation $PRC(t;j;rcv)=K\{[AC_M(\tau_{M,p})-AC_M(\tau_{M,e})]/AC_M(\tau_{M,p})\}^m$.

15. The apparatus of claim 11, wherein said fractions f1 and f2 are chosen to be equal to each other.

16. The apparatus of claim 11, wherein the value f of at least one of said fractions f1 and f2 is chosen to lie in the range $0<f\leq 0.08$.

17. The apparatus of claim 11, wherein at least one of said selected fraction α or said fraction β has the value 0.5.

18. The apparatus of claim 11, wherein said selected parameter m is equal to 1.

19. The apparatus of claim 11, wherein said selected parameter K'' is substantially zero.

20. The apparatus of claim 11, wherein said selected parameter K'' (meters) is chosen to be approximately −4.84, −5.18 or −5.49, depending upon said SATPS source number j.

21. A method of synchronizing to a reference signal the timing of a received composite, code phase SATPS signal, the composite signal consisting of a preferred, interference-free signal distorted by at least one interfering signal, to determine an undistorted timing point of the preferred signal, the method comprising the steps of:

(1) receiving at a user receiver a composite code phase SATPS signal including a preferred, interference-free, direct digital signal and at least one interfering digital signal, where the preferred digital signal has a selected signal bit length of $\Delta^\tau chip$;

(2) generating an autocorrelation function $AC_M(\tau)$ representing a timing relationship between the composite signal and a selected reference signal and that depends upon the value of a time shift variable t between the composite signal and the selecting reference signal;

(3) determining at least two of three autocorrelation function values $AC_M(^\tau M,e)$, $AC_M(^{96} M,p)$ and $AC_M(^\tau M,1)$ where $^\tau M,e$, $^\tau M,p$ and $^\tau M,1$ are time shift values that satisfy the relations $0<^\tau M$, $p-^\tau M$, $e<\Delta^\tau chip$ and $0<^\tau M,1-^\tau M,p<\Delta^\tau chip$;

(4) forming a first linear combination of at least two of the three autocorrelation function values $AC_M(^\tau M, e)$, $AC_M(^\tau M,p)$ and $AC_M(^\tau M,1)$;

(5) forming a second linear combination of at least two of the three autocorrelation function values $AC_M(^\tau M, e)$, $AC_M(^\tau M,p)$ and $AC_M(^\tau M,1)$ that is different from the first linear combination;

(6) forming a ratio R of the first linear combination divided by the second linear combination;

(7) estimating a pseudorange value shift PRC in a pseudorange value associated with the preferred signal, measured at the user receiver, from at least one SATPS signal source as a first selected constant, multiplied by the ratio R, plus a second selected constant;

(8) determining a pseudorange value PR(t;j;rcv) for the SATPS signal number j received at the user receiver with the pseudorange shift PRC(t;j;rcv) removed from the pseudorange value:

(9) utilizing results obtained via at least one of said steps (1) through (8) to synchronize to said selected reference signal said timing of said received composite, code phase SATPS signal.

22. Apparatus for synchronizing to a reference signal the timing of a received composite, code phase SATPS signal, the composite signal consisting of a preferred, interference-free signal distorted by at least one interfering signal, to determine an undistorted timing point of the preferred signal, the apparatus comprising:

a user antenna and user receiver, including a computer, that receive a composite code phase SATPS signal including a preferred, interference-free, direct digital signal and at least one interfering digital signal, where the preferred digital signal has a selected signal bit length of $\Delta^\tau chip$, where the computer is programmed to:

(1) generate an autocorrelation function $AC_M(\tau)$ representing a timing relationship between the composite signal and a selected reference signal and that depends upon the value of a time shift variable t between the composite signal and the selecting reference signal;

(2) determine at least two of three autocorrelation amplitudes $AC_M(^\tau M, e)$, $AC_M(^\tau M,p)$ and $AC_M(^\tau M,1)$ and at least two of three corresponding code phase time shift values $^\tau M$, e, $^\tau M,p$ and $^\tau M,1$, where $^\tau M$, e, $^\tau M,p$ and $^\tau M,1$ are time shift values that satisfy the relations $0<^\tau M$, $p-^\tau M,e <\Delta^\tau chip$ and $0<^\tau M,1-^\tau M,p<<\Delta^\tau chip$;

(3) form a first linear combination of at least two of the three autocorrelation function values $AC_M(^\tau M, e)$, $AC_M(^\tau M,p)$ and $AC_M(^\tau M,1)$;

(4) form a second linear combination of at least two of the three autocorrelation function values $AC_M(^\tau M,$ e), $AC_M(^\tau M,p)$ and $AC_M(^\tau M,1)$ that is different from the first linear combination;

(5) form a ratio R of the first linear combination divided by the second linear combination;

(6) estimate a pseudorange value shift PRC in a pseudorange value associated with the preferred signal, measured at the user receiver, from at least one SATPS signal source as a first selected constant, multiplied by the ratio R, plus a second selected constant;

(7) determine a pseudorange value PR(t;j;rcv) for the SATPS signal number j received at the user receiver with the pseudorange shift PRC(t;j;rcv) removed from the pseudorange value; and (8) utilizing results obtained via at least one of said steps (1) through (7) to synchronize to said selected reference signal said timing of said received composite, code phase SATPS signal.

* * * * *